United States Patent [19]

Onishi et al.

[11] Patent Number: 4,649,610
[45] Date of Patent: Mar. 17, 1987

[54] MACHINE TOOL

[75] Inventors: Hikaru Onishi, Itami; Ichiro Sato, Amagasaki; Mitsunobu Ryugo, Takarazuka; Norio Fukumori, Amagasaki, all of Japan

[73] Assignee: Kanzaki Kokyukoki Mfg. Co. Ltd., Amagasaki, Japan

[21] Appl. No.: 854,790

[22] Filed: Apr. 23, 1986

[30] Foreign Application Priority Data

May 13, 1985 [JP] Japan ............................ 60-101893

[51] Int. Cl.⁴ .......................................... B23Q 3/157
[52] U.S. Cl. ................................. 29/26 A; 29/568; 408/35
[58] Field of Search ................. 29/26 A, 568; 408/35, 408/239, 239 A, 240; 409/233

[56] References Cited

U.S. PATENT DOCUMENTS

| 3,789,473 | 2/1974 | Pagella et al. | 29/568 |
| 4,050,146 | 9/1977 | Geiger | 29/568 |
| 4,110,898 | 9/1978 | Yamaoka et al. | 29/568 |

FOREIGN PATENT DOCUMENTS

| 3009357 | 10/1981 | Fed. Rep. of Germany | 29/568 |
| 24747 | 8/1975 | Japan | 29/568 |
| 47942 | 12/1978 | Japan | 29/568 |
| 0045312 | 4/1981 | Japan | 408/35 |
| 1333191 | 10/1973 | United Kingdom | 29/568 |

Primary Examiner—Z. R. Bilinsky

[57] ABSTRACT

In a machine tool comprising a column (2) mounted for a horizontal sliding movement, a drive unit (4) mounted on the column for a vertical sliding movement, and a magazine (7) located above the drive unit and mounted on the column for a rotational movement and for a horizontal sliding movement, the magazine is particularly adapted to store a plurality of gang heads (8) and individual tools (9) which may be equipped selectively to the drive unit one by one. The drive unit includes a first clamping device (16) disposed within a spindle (14) thereof and further plural second clamping devices (18) which contributes to clamp each of the heads firmly to the unit so that large-scaled gang heads may be employed.

Gang heads and tools may be exchanged quickly between the drive unit and magazine. Portions of workpieces unworkable by large-scaled gang heads may be worked by the individual tools.

6 Claims, 14 Drawing Figures

MACHINE TOOL

FIELD OF THE INVENTION

This invention relates to a machine tool of the type having an automatic tool-exchaging mechanism. More particularly, the present invention relates to a novel machine tool in which a plurality of gang heads as well as a plurality of tools are stored in a single magazine and in which, when in use, one of such gang heads and tools is selectively equipped to a drive unit having a spindle for working operations.

BACKGROUND OF THE INVENTION

There are known machine tools of the type in which a plurality of tools may be exchanged one by one automatically, as shown, for example, in U.S. Pat. No. 3,789,473 and British Pat. No. 1,333,191, and another machine tools of the type in which a plurality of gang heads each having plural tools may be exchanged one by one, as shown, for example, in U.S. Pat. No. 4,110,898 and Japanese Patent Publication No. 47,942/78. However, there has not been known a machine tool in which a plurality of gang heads as well as a plurality of tools may be exchanged one by one automatically.

There are known machine tools in which a magazine for storing a plurality of gang heads is provided above a liftable drive unit which is selectively lifted for a quick exchange of gang head to be equipped to such drive unit. In the machine tools of this type according to the prior art, a gang head is clamped only at the input shaft thereof to a drive unit or the spindle of such drive unit. In such machine tools, relatively small-scaled gang heads are employed as exchangeable heads for securing a required clamping strength.

It is preferred for a high working efficiency to employ large-scaled gang heads each performing a working on a number of portions or a large area to be worked at a same time.

However, a machine tool according to the prior art in which a liftable drive unit is employed for a quick exchange of gang head provides a limit in enlarging the scale of gang head from the clamping strength therefor referred to above. Further, a large-scaled gang head will cause a problem that it is apt to leave unworked small portions of a workpiece to be worked.

Accordingly, a primary object of the present invention is to provide a novel machine tool of the type having a liftable drive unit for a quick exchange of gange head in which exchangeable gang heads may be large-scaled for a high working efficiency and in which a plurality of tools for working small portions of workpieces which are unworkable by a large-scaled gange head may be exchanged quickly, too.

BRIEF DESCRIPTION OF THE DRAWINGS

In the accompanying drawings.

GENERAL DESCRIPTION

Figure 1:
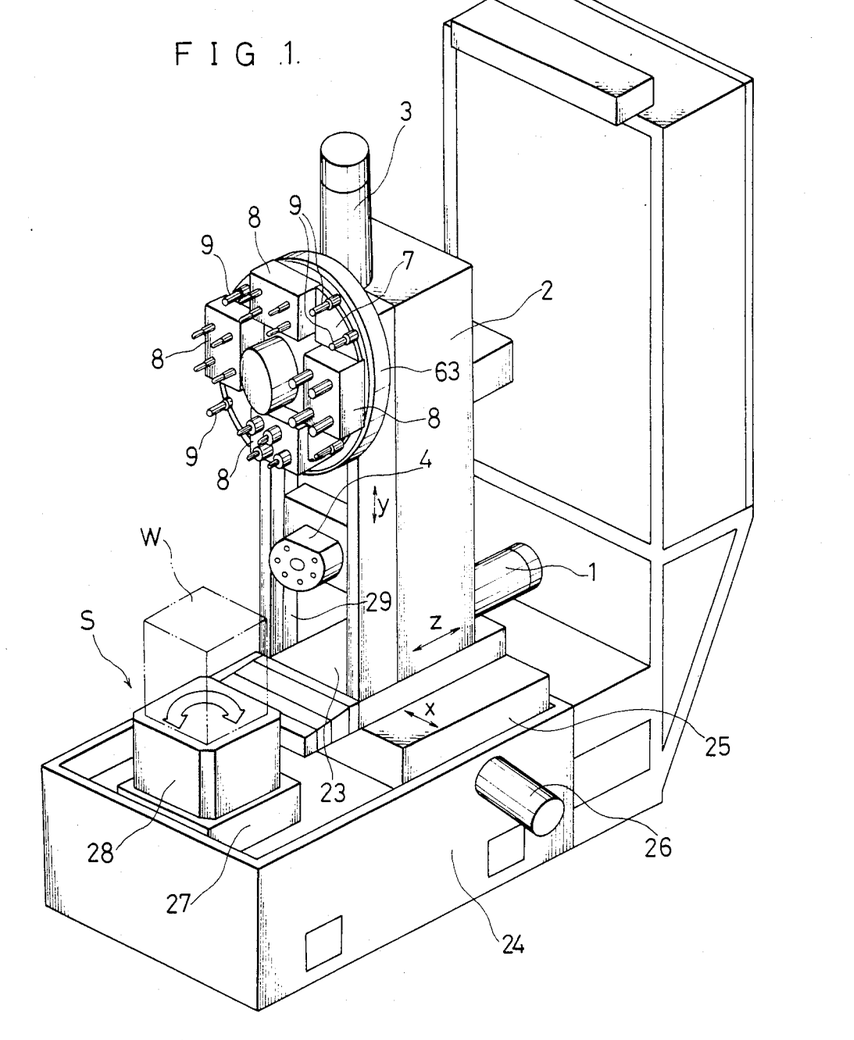
FIG. 1 is a perspective view of a preferred embodiment of the machine tool according to the present invention.

As shown in FIG. 1, the machine tool according to the present invention comprises:

(A) a column 2 mounted for sliding movement along a horizontal direction towards and away from a working station S, said column being driven to slide by a column-driving means or cylinder 1;

(B) a drive unit 4 mounted on said column 2 at a front side facing said working station S for sliding movement along a vertical direction, said drive unit being driven to slide by a drive unit-driving means or motor 3 provided to said column 2, and (C) a magazine 7 having a horizontal axis which is parallel to the axis of said drive unit 4 and mounted on said column 2 for rotational movement about said horizontal axis and for sliding movement along said horizontal axis, said magazine being driven to rotate by a first magazine-driving means or motor 5 (shown in FIG. 9) provided to said column and being driven to slide by a second magazine-driving means or cylinder 6 (shown in FIG. 9) provided to said column.

As also shown in FIG. 1, a plurality of gang heads 8 as well as a plurality of individual tools 9 are stored in the magazine 7. These gang heads 8 and tools 9 are such that are shown in FIGS. 4 to 8. That is, each of the gang heads 8 has an input shaft 10 projecting rearwardly therefrom, a first retaining portion 10a provided to the rear end of the input shaft, and plural second retaining portions 11 projecting rearwardly from each of the heads. Each of the tools 9 has an input shaft portion 12 and a third retaining portion 12a provided to the rear end of the former portion 12.

Figures 2, 3:
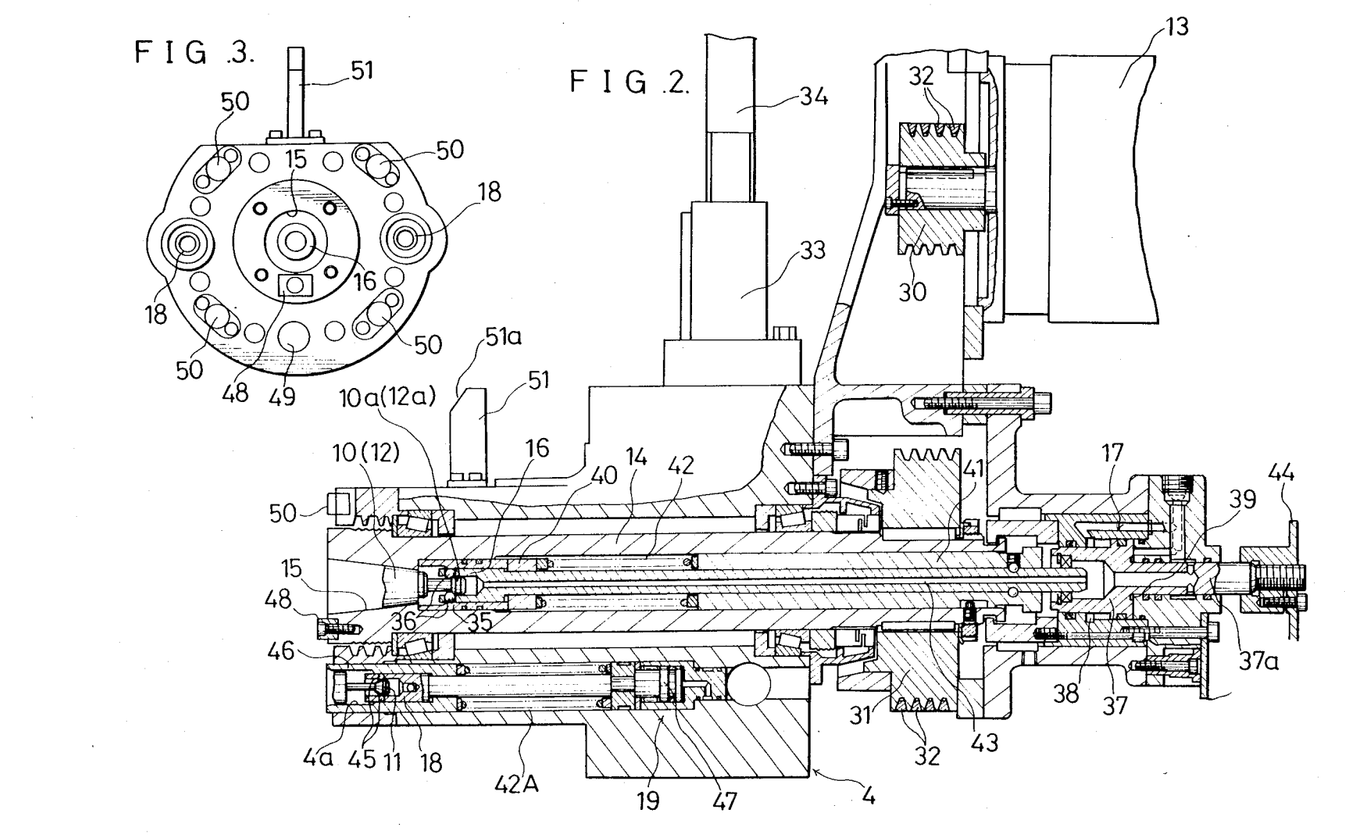
FIG. 2 is a sectional side view, partially developed, of a drive unit employed in the machine tool shown in FIG. 1.
FIG. 3 is a front view of a part of the drive unit shown in FIG. 2.
Figure 4:
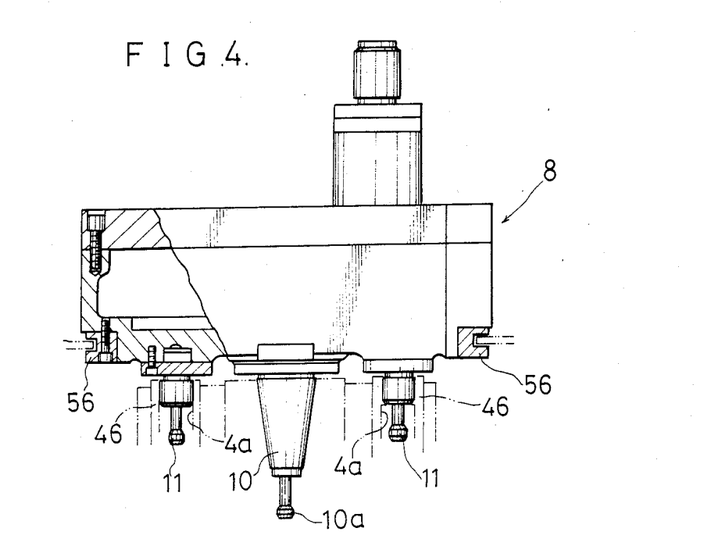
FIG. 4 is a plan view, partially in section, of a gang head employed in the machine tool shown in FIG. 1.
Figure 5:
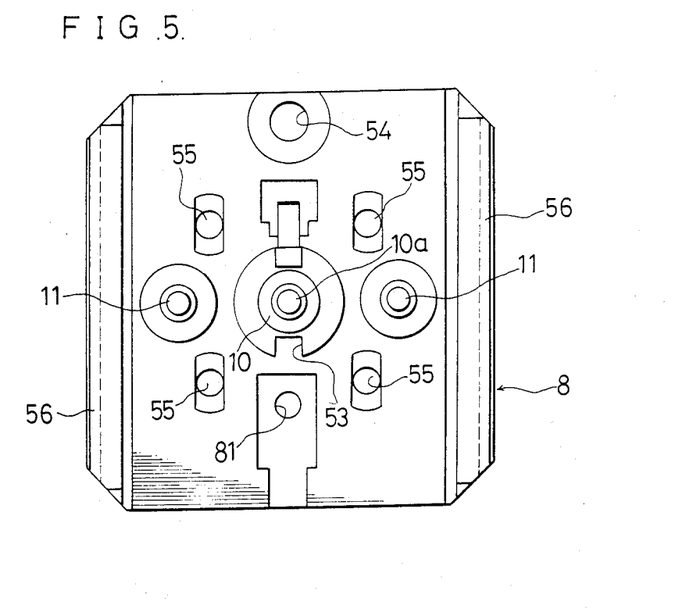
FIG. 5 is a rear view of the gang head shown in FIG. 4.

As shown in FIGS. 2 and 3, the drive unit 4 comprises:

(a) a spindle-driving motor 13;

(b) a spindle 14 driven to rotate by the said motor and having therein a coaxial first bore 15, including a front end opening, adapted to fittingly receive each of said input shaft 10 and said input shaft portion 12;

(c) a first clamping device 16 coaxially and slidably disposed within said spindle and driven to slide by a first actuator or cylinder 17, said first clamping device being adapted to engage at a retreated position thereof each of said first retaining portion 10a and said third retaining portion 12a so as to clamp each of said input shaft 10 and said input shaft portion 12 to said spindle; and (d) plural second clamping devices 18 slidably disposed within plural second bores 4a formed within said drive unit and located outside and in parallel with said spindle, each of said second bores including a front end opening so as to receive each of said second retaining portions (11), and said second clamping devices being driven to slide by second actuators or cylinders 19 and adapted to engage at a retreated position thereof said second retaining portions so as to clamp each of said gang heads 8 to said drive unit.

Figures 9, 10:
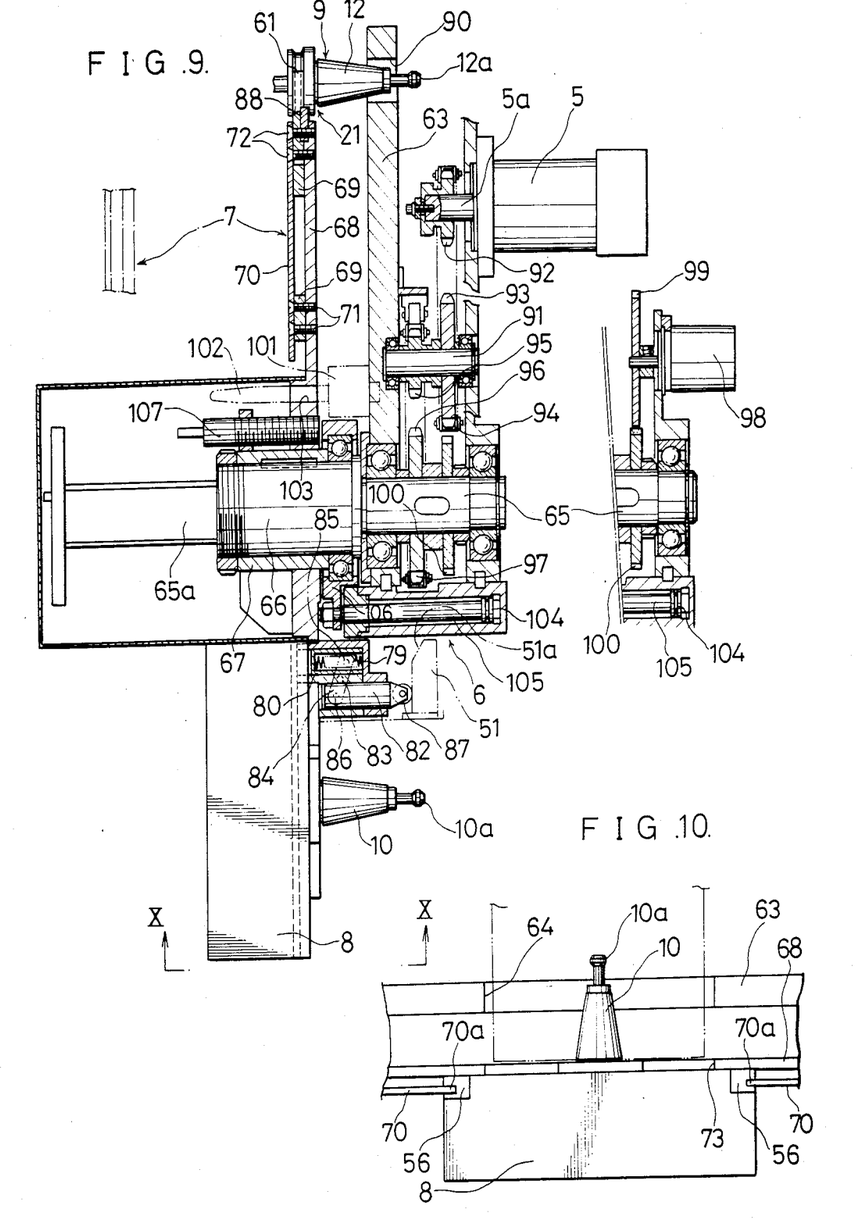
FIG. 9 is a sectional side view, partially developed, of a magazine and some mechanisms, associated therewith, employed in the machine tool shown in FIG. 1.
FIG. 10 is a view seen along arrow X—X of FIG. 9, showing a part of the magazine together with a gang head.
Figure 11:
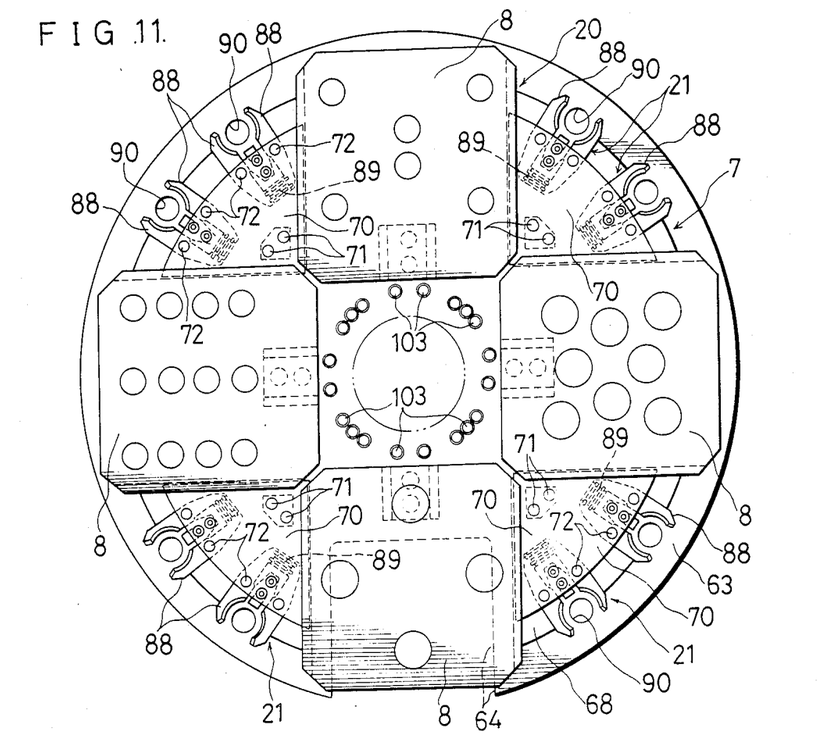
FIG. 11 is a front view, partially omitted, of the magazine shown in FIG. 9.

As shown in FIGS. 9 to 11, the magazine 7 comprises:

(e) a plurality of head storage rooms 20 and a plurality of tool storage rooms 21 each of which is disposed so as to be located just above said drive unit 4 by a selective rotation of said magazine, each of said head storage rooms being adapted to receive each of said gang heads 8 equipped to said drive unit 4 from below at a retreated position of said magazine and further being adapted to get said first and second retaining portions 10a and 11 of the said each gang head out of said first and second bores 15 and 4a at an advanced position of said magazine, and each of said tool storage rooms being adapted to receive each of said tools 9 equipped to said drive unit from below at said retreated position of said magazine and further being adapted to get said third retaining portion 12a of the said each tool out of said first bore 15 at said advanced position of said magazine.

The machine tool according to the present invention operates as follows:

As shown in FIG. 2, each of the gang heads 8 is equipped to the drive unit 4 by inserting the input shaft 10 and second retaining portions 11 into the first and second bores 15 and 4a and by retreating the first and second clamping devices 16 and 18 so as to engage same to the retaining portions 10a and 11. In such clamped state, the input shaft 10 is clamped to the spindle 14 and the second retaining portions 11 are clamped to the drive unit 4 so that the gang head 8 are clamped at plural portions thereof to the drive unit 4. Gang head 8 may be unclamped by advancing the first and second clamping devices 16 and 18. In such unclamped state, gang head 8 may be removed from the drive unit 4 by displacing such head 8 forwardly so as to get the input shaft 10 and the first retaining portion 10a thereon as well as the second retaining portions 11 out of the first and second bores 15 and 4a.

Each of the tools 9 may be equipped to the front of drive unit 4 in a clamped condition by utilizing the input shaft portion 12 having thereon the third retaining portion 12a in the manner described above with respect to the input shaft 10 of a gang head. Such tool 9 may be unclamped and removed from the unit 4 in a manner similar to that described above with respect to the input shaft 10 of a gang head 8.

For working a workpiece W which is placed to the working station S as shown in FIG. 1, the level of drive unit 4 having been equipped with a gang head 8 or tool 9 is suitably adjusted using the drive unit-driving means 3. Drive unit 4 is then advanced together with the column 2 using the column-driving means 1 in a condition that the spindle 14 is driven to rotate by the spindle-driving motor 13 so as to provide a rotation to plural tools of a gang head 8 or a tool 9.

For exchanging gang head 8 or tool 9, one of the head storage rooms 20 or tool storage rooms 21 which is now empty is positioned just above the drive unit 4 by a rotation of the magazine 7 by means of the first magazine-driving means 5. Drive unit 4 is lifted using the driving means 3 to a level where a gang head 8 or tool 9 on the front of drive unit 4 is received by the empty storage room 20 or 21. The gang head 8 or tool 9 is then unclamped from the unit 4. Such head 8 or tool 9 is then removed from drive unit 4 by advancing the magazine 7 by means of the second magazine driving means 6 to a position shown in phantom in FIG. 9. Then, the magazine 7 is rotated using the first driving means 5 so as to position a fresh gang head 8 or tool 9 to be used next in the front of drive unit 4. Magazine 7 is then retreated using the second driving means 6 to the position shown in FIG. 9. By this, the input shaft 10 and first retaining portion 10a thereon as well as the second retaining portions 11 of the fresh gang head or the input shaft portion 12 and third retaining portion 12a thereon of the fresh tool are inserted into corresponding bores 15, 4a of the drive unit 4. The fresh head 8 or tool 9 is then clamped to the drive unit 4 by retreating both of the first and second clamping devices 16 and 18 or the first clamping device 16. The drive unit 4 is then lowered using the driving means 3 to a level where the next working on a workpiece is to be performed.

Particular advantages of the present invention are as follows:

In a machine tool of the type having a liftable drive unit for a quick exchange of gang head, the present invention provides plural second clamping devices 18 in the drive unit 4 other than the first clamping device 16 in the spindle 14 of such drive unit 4 so that a gang head 8 is clamped by the drive unit not only at the input shaft 10 but at the second retaining portions 11 projecting rearwardly from the head 8. It is thus seen that clamping strength for each of the gang heads 8 is considerably enlarged in comparison with that in a machine tool according to the prior art. Exchangeable gang heads 8 may thus be large-scaled so as to heighten the working efficiency. Small portions of workpieces which are unworkable by large-scaled gang heads 8 may be worked also with a high efficiency using individual tools 9 which are stored in the magazine 7 for storing the gang heads 8 and may thus be exchanged quickly, too.

When gang heads to be stored in a head storage magazine are large-scaled, considerable dead space is produced between two adjacent head storage rooms in such magazine. However, the present invention will produce no substantial dead space in the magazine 7 because one or more tool storage rooms 21 which may be small-sized may be arranged between two adjacent head storage rooms 20.

SPECIFIC DESCRIPTION

General Structure

A preferred embodiment will now be detailed.

As shown in FIG. 1, column 2 referred to before is fixedly mounted on a table 23 which is driven to slide along arrow z by the column-driving means or cylinder 1 referred to before. Table 23 in turn is fixedly mounted on another table 25 which is received slidably along arrow x by a bed 24 and is driven to slide by a table-driving cylinder 26.

As also shown in FIG. 1, a jig 28 for supporting a workpiece W is mounted on a rotatable indexing table 27 which is provided to the working station S.

Inner walls of the column 2 are formed with a pair of guide grooves 29 for slidably receiving the drive unit 4.

Drive Unit

Embodical structure of the drive unit 4 shown will be detailed by referring to FIGS. 2 and 3.

Spindle-driving motor 13 set forth before is arranged on the rear of drive unit 4. Plural V-belts 32 are entrained over a pulley 30 on the motor shaft and another pulley 31 on a base end portion of spindle 14. To the upper surface of drive unit 4 is secured a nut member 33 which is prevented from rotation by the column 2. Feed screw 34 driven to rotate by the drive unit-driving means or motor 3 set forth before and shown in FIG. 1 is threadingly engaged with the nut member 33 so that drive unit 4 may be lifted and lowered by the motor 3.

Spindle 14 has an axial thorough bore which is tapered at the front end thereof to provide a conical bore portion. The first bore 15 set forth before is provided by such outwardly diverging conical bore portion. The first clamping device 16 set forth before is rod-shaped and slidably disposed within the spindle 14. Enlarged front end portion of this clamping device 16 is slidably fitted into a sleeve 35 which is fixedly arranged just behind the first bore 15. Front end portion of the sleeve 35 has an enlarged inner diameter. Each of the first retaining portion 10a of each gang head 8 and the third retaining portion 12a of each tool 9 includes a forwardly converging conical surface with which plural balls 36 may engage from the forward direction. These balls 36 are supported by the clamping device 16 so that they are moveble radially of the device 16 but unmovable axially of the device 16 relative to such clamping device. The first clamping device 16 is fashioned such that when retreated it urges balls 36 so as to clampingly engage such balls with the retaining portion 10a or 12a and, when advanced, it displaces balls 36 within the front end portion of sleeve 35 having an enlarged inner diameter so as to disengage such balls from the retaining portion 10a or 12a.

Within a rear end portion of the drive unit 4 is disposed a piston 37 which is connected to the clamping device 16 so as to slide such device by a sliding movement of piston 37. The first actuator 17 set forth before is provided by a double-acting hydraulic cylinder which comprises the piston 37 and a pair of fluid chambers 38 and 39 formed before and behind such piston.

A compression spring 42 is disposed between a sleeve 40, located just behind the fixed sleeve 35 and received by the clamping device 16, and another sleeve 41 which is spaced axially from the sleeve 40 and is received by and connected to the device 16. This spring 42 forces the clamping device 16 to move rearwardly so that clamping by the device 16 is not released even when a breakdown of electric power occurs to cause a failure of supply of fluid pressure to the hydraulic cylinder 17. Within the clamping device 16 is formed a fluid passage 43 for supplying lubricant oil to the clamping portion including balls 36. Piston 37 has an integral rod 37a, projected rearwardly from the drive unit, on which a dog 44 is fixedly mounted for actuating a limit switch means (not shown) which detects clamping and unclamping by the first clamping device 16.

The second clamping devices 18 and actuators 19 therefor, both set forth before, are similarly constructed. Thus, each of the rod-shaped clamping devices 18 supports plural balls 45 which may be clampingly engaged with each of the second retaining portions 11 having a forwardly converging conical surface. Such balls 45 are disposed within a sleeve 46 which provides a forward end portion of each second bore 4a set forth before. Each clamping device 18 is driven to slide by each second actuator 19 which is constructed as a double-acting hydraulic cylinder comprising a piston 47. A compression spring 42A which corresponds to the spring 42 set forth before is also associated with each clamping device 18. As shown in FIG. 3, a pair of or two second clamping devices 18 are provided in the drive unit 4 shown.

In the embodiment shown, a drive key 48 is fixedly secured to the front end face of spindle 14. This key 48 will prevent in cooperation with a corresponding key way, which is provided to each of the gang heads 8 and tools 9 as will be detailed later, the input shaft 10 or input shaft portion 12 from a rotation relative to the spindle 14 so that driving power is transmitted with certainty from the spindle 14 to the input shaft 10 of a gang head 8 and to the input shaft portion 12 of a tool 9. For the purpose of achieving an accurate positioning of gang head 8 on the drive unit in two horizontal directions (directions along arrows x and z shown in FIG. 1), a suitable number of seat pads 50 are provided on the front end face of drive unit 4. To the upper surface of a front end portion of the drive unit 4 is attached a cam plate 51 which will be detailed later.

Gang Heads and Tools

Gang heads 8 and tools 9 shown will be detailed by referring to FIGS. 4 to 8.

The input shaft 10 of each gang head 8 includes a cone-shaped rear end portion at which shaft 10 projects rearwardly from the head 8 and is fitted into the first bore 15 of spindle 14 of the drive unit 4 for connecting the shaft 10 to spindle 14. Each of the second retaining portion 11 of each gang head 8 includes an enlarged base end portion at which such retaining portion 11 may be close fitted into the second bore 4a of drive unit 4, as shown in phantom in FIG. 4. The input shaft 10 has, at its collar portion abutting the rear surface of gang head 8, the key way 53, referred to before, into which the drive key 48 shown in FIGS. 2 and 3 may be fitted. Each gang head 8 has at its rear side a bore 54 for fittingly inserting a lock pin 80 which will be detailed later. On the rear face of head 8 are attached seat pads 55 which cooperate with seat pads 50 on the drive unit 4 for an accurate positioning of the head 8. Gang head 8 further includes a pair of C-letter shaped rails 56 arranged at one and the other sides of head 8.

Figure 6:
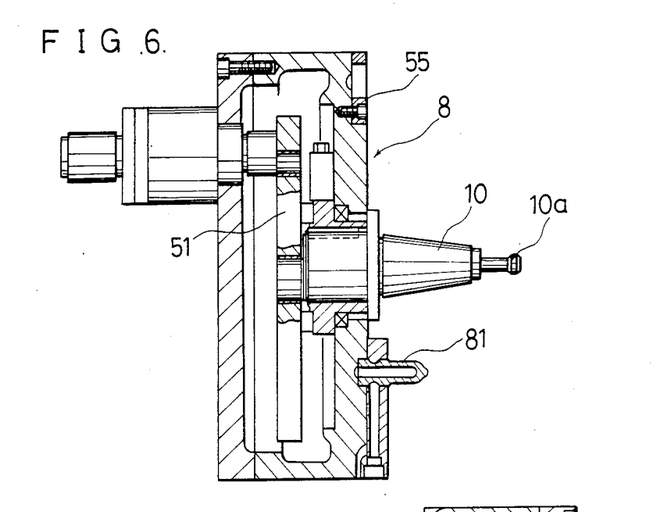
FIG. 6 is a sectional side view showing an example of transmission mechanism which may be provided within the gang head shown in FIGS. 4 and 5.
Figure 7:
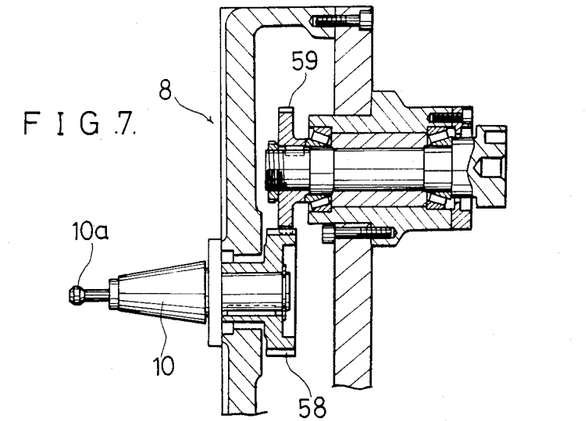
FIG. 7 is a sectional side view showing an alternative example of transmission mechanism which may be provided within the gang head shown in FIGS. 4 and 5.

In FIGS. 6 and 7, there are shown two examples of transmission mechanism between plural tools of a gang head 8 and the input shaft 10 thereof. The mechanism shown in FIG. 6 comprises a crank means 51, whereas the mechanism shown in FIG. 7 comprises meshing gears 58 and 59. In FIG. 6, numeral 81 designates a coolant supply pipe which is fitted into a coolant supply passage or bore 49 (FIG. 3) formed to the drive unit 4.

Figure 8:
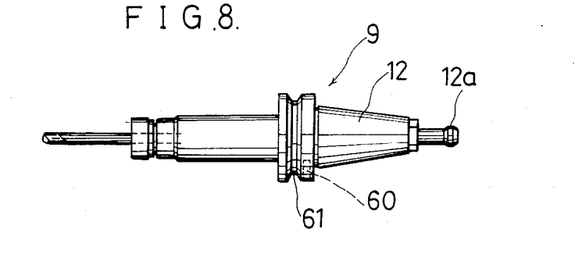
FIG. 8 is a side view of a tool employed in the machine tool shown in FIG. 1.

Input shaft portion 12 of each of the tools 9 is also cone-shaped in accordance with the cone-shaped first bore 15 of drive unit or spindle 14 thereof, as shown in FIG. 8. Each tool 8 also comprises at a collar-shaped base end of the input shaft portion 12 a key way 60 into which the drive key 48 shown in FIGS. 2 and 3 may be fitted. Tool 9 has a grip portion 61 in the shape of annular groove formed between a pair of collars.

Magazine

Detailed structure of the magazine 7 shown will be described by referring to FIGS. 9 to 11 which are reduced in scale more largely than FIGS. 2 to 8.

Column 2 includes at its front side a support disk 63 by which the magazine 7 is supported. This disk 63 is formed at its lower end portion with a cut-out or groove 64 having an open lower end. Column 2 journals a drive shaft 65 which is arranged coaxially with the disk 63. This drive shaft 65 includes a threaded portion 65a which is located before the disk 63.

Figure 12:
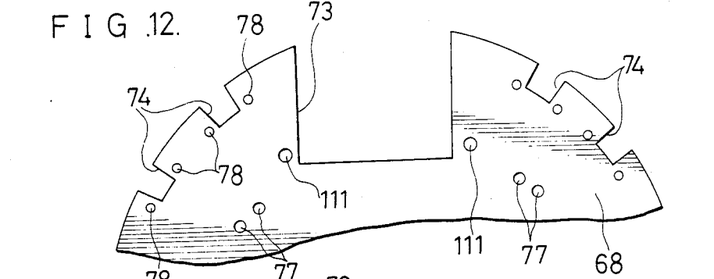
FIG. 12 is a front view of a part of a member of the magazine shown in FIGS. 9 and 11.
Figure 13:
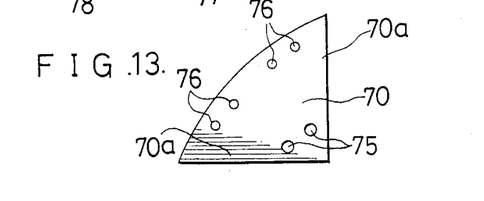
FIG. 13 is a front view of another member of the magazine shown in FIGS. 9 and 11.

Magazine 7 comprises a nut member 66 thereadingly mounted on the threaded portion 65a, a hollow cylindrical member 67 fixedly mounted on the nut member 66, a disk member 68 fixedly mounted on the cylindrical member 67, and a plurality of sector plates 70 which are located before the disk member 68 by interposing spacers 69 therebetween and are secured to such disk member by means of fasteners or bolts 71 and 72. The magazine 7 shown is fashioned such that it may store four gang heads 8 and eight tools 9. As shown in FIG. 12, the disk member 68 is provided with four larger cut-outs 73 for forming four head storage rooms 20 and eight smaller cut-outs 74 for forming eight tool storage rooms 21. Each of these cut-outs 73 and 74 has its open end at the outer periphery of disk member 68 and two of the smaller cut-outs 74 are disposed between each two adjacent larger cut-outs 73. Four of the sector plates 70 are provided which are located before each two adjacent smaller cut-outs 74. As shown in FIG. 13, each of the sector plates 70 has therethrough a pair of radially inward bores 75 for passing fasteners 71, shown in FIG. 9, and two pairs of radially outward bores 76 for passing fasteners 72 also shown in FIG. 9. As shown in FIG. 12, corresponding bores 77 and 78 for passing the fasteners 71 and 72 are formed to the disk member 68. Bores 78 are arranged at both sides of each smaller cut-out 74. Each of the sector plates 70 is sized so that when it is secured to the disk member 68 each of the edge portions 70a of sector plate 70 may receive slidably one of the rails 56 of a gang head 8, as shown in FIG. 10.

Each of the head storage rooms 20 of magazine 7 is fashioned such that it stores a gang head 8 in a state where the pair of rails 56 of such head are received by the edge portions 70a of two adjacent sector plates 70. For preventing the gang heads 8 stored in the magazine from getting away from such magazine, lock means is provided to each of the head storage rooms 20. As shown in FIG. 9, this lock means comprises the lock pin 80 referred to before which is slidably supported by the disk member 68 and is biased to move forwardly by a spring 79. The lock pin 80 is adapted to be fittingly inserted under the biasing of spring 79 into the bore 54 of gang head 8 shown in FIG. 5 so as to lock such head to the disk member 68. Another pin 82 which is arranged in parallel with the lock pin 80 is slidably supported by the disk member 68. A lever 84 pivotally supported at a mid portion thereof by disk member 68 through a pivot pin 83 are pivotally connected at one and the other ends of such lever to pins 80 and 82 by connecting pins 85 and 86. Pin 82 has at its rear end a roller 87 which may engage the front face of cam plate 51, referred to before, on the drive unit 4 when such unit is lifted. Cam plate 51 is arranged so that, when it becomes lifted together with the drive unit 4 equipped with a gang head 8, the front face of such cam plate becomes engaged to the roller 87 as from a sloped face portion 51a so as to push the pin 82 to move forwardly to an extent such that the lock pin 80 is moved rearwardly through the lever 84 to a position where the pin 80 does not interfere with the gang head 8 on the unit 4. Such gang head 8 is locked by the lock pin 80 when, after unlocking the head from the drive unit, the magazine is moved forwardly toward the position shown in phantom in FIG. 9 so as to allow a projecting movement of the lock pin into the bore 54 shown in FIG. 4. When the magazine 7 storing a gang head 8 at a head storage room 20 which is now in front of the lifted drive unit 4 becomes retreated from the position shown in phantom in FIG. 9, the roller 87 becomes engaged to and pushed by the cam plate 51 so as to get the lock pin 80 out of the bore 54 so that the gang head becomes unlocked.

Each of the tool storage rooms 21 of magazine 7 comprises a pair of clamp arms 88 which are pivotally supported by bolts 72 located at both sides of each of the small cut-outs 74 in the disk member 68 for securing each sector plate 70 to such disk member. Between inner end portions of this pair of clamp arms 88 is disposed a spring 89 which biases the clamp arms so that outer end portions thereof are moved towards each other. The pair of clamp arms 88 are adapted to clamp each of the tools 9 at the grip portion 61 of such tool shown in FIG. 8. When a tool 9 equipped to drive unit 4 becomes lifted together with the unit 4 up to a storage room 21, the pair of clamp arms 88 become once spread by the tool and then closed again by the biasing force of spring 89. Each of the smaller cut-outs 74 in the disk member 68 is adapted to accept the input shaft portion 12 of each tool 9. Disk 63 on the column 2 is formed with thorough bores 90 each of which may accept a rear end portion of the input shaft portion 12 of each tool 9, as shown in FIG. 9, when the magazine is retreated.

As shown in FIG. 9, the column 2 further journals an intermediate shaft 91 which is arranged in parallel with the drive shaft 65. The first magazine-driving means 5 set forth before is formed to a hydraulic motor and is drivingly connected to the intermediate shaft 91 by means of chain 94 entrained over sprocket wheels 92 and 93 on the motor shaft 5a and intermediate shaft 91. The intermediate shaft 91 in turn is drivingly connected to the drive shaft 65 by means of chain 97 entrained over sprocket wheels 95 and 96 on these shafts. For detecting the rotating phase of magazine 7, column 2 is further equipped with a rotary encorder 98 which is operatively connected to the drive shaft 65 by meshing gears 99 and 100. The column 2 further supports a slidable posioning pin 102 which is driven to slide by a hydraulic cylinder 101 so as to determine the rotating position of magazine 7 in cooperation with positioning bores 103 formed to the disk member 68.

As also shown in FIG. 9, the second magazine-driving means 6 set forth before is provided by a double-acting hydraulic cylinder having a piston 104. Its piston rod 105 is fixedly coupled to a ring 106 which is moved together with the cylindrical member 67 and, therefore, with magazine 7. The disk member 68 of magazine 7 is provided with a shock absorber 107 which acts as a movable stopper pin at the advanced and retreated positions of magazine 7 so as to stop the magazine with no substantial shock.

Operation

In the machine tool shown, each of the gange heads 8 and tools 9 is selectively equipped in a clamped condition to the drive unit 4 in the manner detailed before. A gang head 8 equipped to the drive unit 4 is accurately positioned relative to such unit in the direction along arrow y due to close fitting of the input shaft 10 into the first bore 15 and due to close fitting of the enlarged base end portions of the second retaining portions 11 into the second bores 4a. Further, such gang head 8 is accurately positioned relative to the drive unit 4 in the two horizontal directions along arrows x and z shown in FIG. 1 due to abutting of seat pads 55 shown in FIG. 5 onto seat pads 50 shown in FIGS. 2 and 3.

Before working a workpiece W, the drive unit 4 is adjusted in level along arrow y shown in FIG. 1 using motor 3 as well as in position along arrow x using cylinder 26. For a selective working to be applied to each of the surfaces of a workpiece W, such workpiece is selectively indexed using the indexing table 27.

Exchange of a gang head 8 or tool 9 is carried out in the manner detailed before. Magazine 7 is rotated or indexed at its advanced position shown in phantom in FIG. 9 in a condition that positioning pin 102 has been retreated and get out of bores 103 in the disk member 68. After indexing the magazine 7, positioning pin 102 is advanced so as to be fitted again into one of the bores 103 for an accurate positioning of magazine 7. Such magazine 7 is retreated from the advance position in a condition that it remains accurately positioned by means of pin 102. When the drive unit 4 is lifted for taking a gang head 8 or tool 9 in a condition that such unit 4 has thereon neither a gang head or a tool, magazine 7 having the head or tool to be taken at a storage room just above the unit 4 is previously advanced. Such magazine 7 is then retreated after the drive unit 4 has been lifted. Clamping of a gang head 8 to the magazine 7 is released by such retreatment of magazine by means of cam plate 51, as detailed before. A tool 9 is released from the magazine 7 when the drive unit 4 is lowered, because such tool once spreads the pair of clamp arms 88 when lowered.

Figure 14:
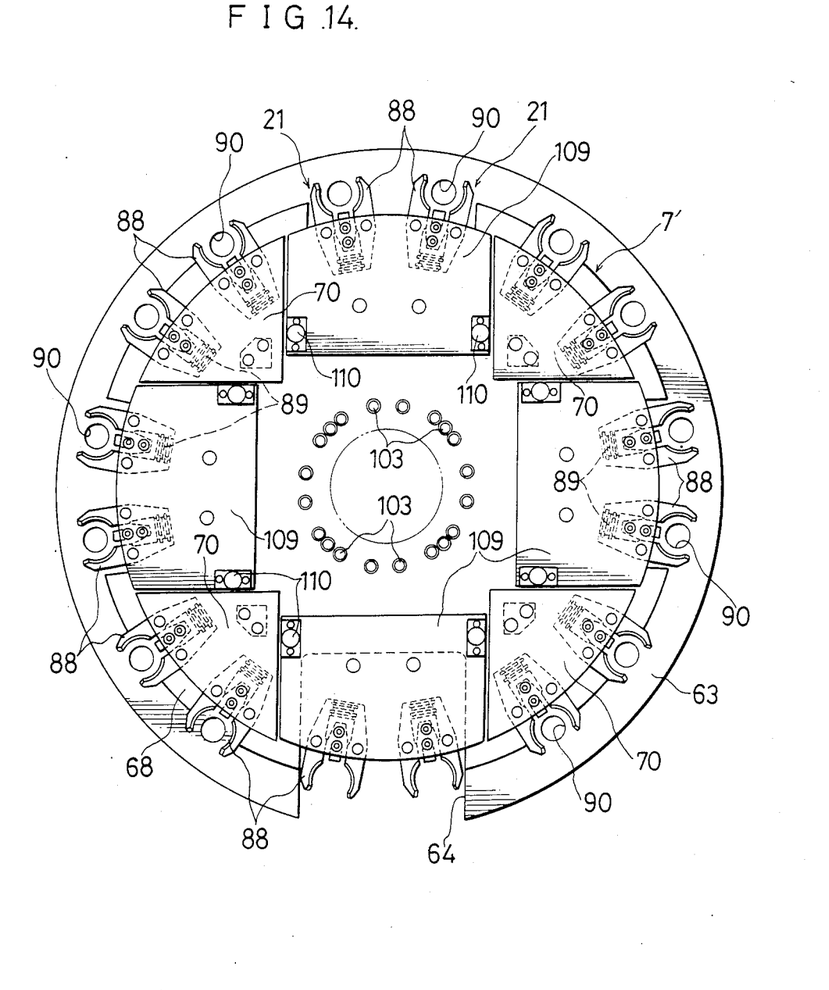
FIG. 14 is a front view, partially omitted, similar to FIG. 11 but showing a magazine having a different function in which essential parts are common to those of the magazine show in FIGS. 9 and 11.

The magazine 7 shown is fashioned such that it may be converted with ease into a magazine for storing individual tools only. FIG. 14 illustrates a magazine 7' of such different function. In the magazine 7' shown in FIG. 14, a plate member 109 having a size somewhat larger than that of each of the cut-outs 73 shown in FIG. 12 are arranged between each two adjacent sector plates 70 and are secured to the disk member 68 by fasteners 110. Spacers (not shown) are disposed between the members 109 and 68 so as to align plate members 109 with sector plates 70 in the axial direction of magazine. A pair of tool storage rooms 21 similar to the tool storage rooms at the sector plates 70 are provided to each of the plate members 109.

Plate members 109 shown in FIG. 14 may readily be attached to the disk member 68 by previously providing to the latter member 68 bores 111 for passing fasteners 110, as shown in FIG. 12. As can be seen from FIGS. 11 and 14, bores 103 for accurately positioning each of the magazines 7 and 7' after indexing same are provided more in number than required in each of the magazines so that the disk member 68 having therein such bores may be made common to both of the magazines 7 and 7'. As can be seen from FIG. 14, thorough bores 90 formed to the disk 63 for accepting a rear end portion of the input shaft portion 12 of each tool 9 are provided so that tools stored at tool storage rooms 21 provided to the plate members 109 can also be accepted by a common disk 63.

We claim:

1. A machine tool comprising:
   (A) a column (2) mounted for sliding movement along a horizontal direction towards and away from a working station (S), said column being driven to slide by a column-driving means (1);
   (B) a drive unit (4) mounted on said column (2) at a front side facing said working station (S) for sliding movement along a vertical direction, said drive unit being driven to slide by a drive unit-driving means (3) provided to said column;
   (C) a magazine (7) having a horizontal axis, which is parallel to the axis of said drive unit (4), and mounted on said column (2) for rotational movement about said horizontal axis and for sliding movement along said horizontal axis, said magazine being driven to rotate by a first magazine-driving means (5) provided to said column and being driven to slide by a second magazine-driving means (6) provided to said column; and
   (D) a plurality of gang heads (8) and a plurality of individual tools (9) to be stored by said magazine (7), each of said gang heads (8) having an input shaft (10) projecting rearwardly therefrom, a first retaining portion (10a) provided to the rear end of said input shaft, and plural second retaining portions (11) projecting rearwardly from said each gang head, and each of said tools having an input shaft portion (12) and a third retaining portion (12a) provided to the rear end of said input shaft portion, said drive unit (4) comprising:
   (a) a spindle-driving motor (13);
   (b) a spindle (14) driven to rotate by the said motor and having therein coaxial first bore (15), including a front end opening, adapted to fittingly receive each of said input shaft (10) and said input shaft portion (12);
   (c) a first clamping device (16) coaxially and slidably disposed within said spindle and driven to slide by a first actuator (17), said first clamping device being adapted to engage at a retreated position thereof each of said first retaining portion (10a) and said third retaining portion (12a) so as to clamp each of said input shaft (10) and said input shaft portion (12) to said spindle; and
   (d) plural second clamping devices (18) slidably disposed within plural second bores (4a) formed within said drive unit and located outside and in parallel with said spindle, each of said second bores including a front end opening so as to receive each of said second retaining portions (11), and said second clamping device being driven to slide by second actuators (19) and adapted to engage at a retreated position thereof said second retaining portions so as to clamp each of said gang heads (8) to said drive unit, and said magazine (7) comprising:
   (e) a plurality of head storage rooms (20) and a plurality of tool storage rooms (21) each of which is disposed so as to be located just above said drive unit (4) by a selective rotation of said magazine, each of said head storage rooms being adapted to receive each of said gang heads (8)

equipped to said drive unit (4) from below at a retreated position of said magazine and further being adapted to get said first and second retaining portions (10a, 11) of the said each gang head out of said first and second bores (15, 4a) at an advanced position of said magazine, and each of said tool storage rooms being adapted to receive each of said tools (9) equipped to said drive unit from below at said retreated position of said magazine and further being adapted to get said third retaining portion (12a) of the said each tool out of said first bore (15) at said advanced position of said magazine.

2. A machine tool as claimed in claim 1 in which said drive unit (4) further comprises a drive key (48) fixedly secured to said spindle (14), said drive key being adapted to be close fitted into a key way (53) formed to said input shaft (10) and into a key way (60) formed to said input shaft portion (12).

3. A machine tool as claimed in claim 1 in which at least one of said tool storage rooms (21) is arranged in said magazine (7) between each adjacent two of said head storage rooms (20).

4. A machine tool as claimed in claim 3 in which said magazine (7) includes a disk member (68) having larger cut-outs (73) adapted to receive each of said gang heads (8) so as to provide said head storage rooms (20), said disk member further having smaller cut-outs (74) at least one of which is arranged between each adjacent two of said larger cut-outs, said smaller cut-outs being adapted to receive each of said tools (9) so as to provide said tool storage rooms (21).

5. A machine tool as claimed in claim 4 in which sector plates (70) secured to said disk member (68) are provided which are located between each adjacent two of said larger cut-outs (73) and are spaced forwardly from said disk member (68), a pair of clamp arms (88) adapted to clampingly receive each of said tools (9) being provided at one and the other sides of each of said smaller cut-outs (74) and between said disk member (68) and each of said sector plates.

6. A machine tool as claimed in claim 1 in which said magazine (7) further comprises head-clamping devices (80) arranged at said head storage rooms (20) and adapted to lockingly clamp each of said gang heads (8), each of said head clamping-devices being fashioned such that it is moved to its inoperative position by cam (51) provided to said drive unit (4) when said drive unit is lifted to each of said head storage rooms in a condition that said magazine is in said retreated position.

* * * * *